(12) United States Patent
Asano

(10) Patent No.: US 12,104,521 B2
(45) Date of Patent: Oct. 1, 2024

(54) DETERIORATION ESTIMATION DEVICE

(71) Applicant: TOYOTA JIDOSHA KABUSHIKI KAISHA, Toyota (JP)

(72) Inventor: Akihiro Asano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/470,747

(22) Filed: Sep. 20, 2023

(65) Prior Publication Data

US 2024/0191651 A1    Jun. 13, 2024

(30) Foreign Application Priority Data

Dec. 9, 2022 (JP) ................................. 2022-197109

(51) Int. Cl.
| | | |
|---|---|---|
| *F02B 39/16* | (2006.01) | |
| *F02B 37/12* | (2006.01) | |
| *F02B 77/08* | (2006.01) | |
| *F02C 6/14* | (2006.01) | |
| *F02C 9/16* | (2006.01) | |
| *F02C 9/28* | (2006.01) | |

(52) U.S. Cl.
CPC ............. *F02B 39/16* (2013.01); *F02B 37/12* (2013.01); *F01N 2340/06* (2013.01); *F01N 2550/14* (2013.01); *F02B 2039/162* (2013.01); *F02B 2039/166* (2013.01); *F02B 77/08* (2013.01); *F02B 77/083* (2013.01); *F02C 6/14* (2013.01); *F02C 9/16* (2013.01); *F02C 9/28* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,087,868 | B2* | 10/2018 | Tsuda | F02B 39/16 |
| 11,434,843 | B1* | 9/2022 | Baramov | F02D 41/0007 |
| 2007/0118271 | A1* | 5/2007 | Wiseman | G05B 23/0283 |
| | | | | 477/30 |
| 2007/0260390 | A1* | 11/2007 | Kim | F01D 21/14 |
| | | | | 701/100 |
| 2013/0255648 | A1* | 10/2013 | Yamamoto | F02B 39/16 |
| | | | | 123/559.1 |
| 2017/0130664 | A1* | 5/2017 | Rueger | F02D 41/222 |
| 2024/0077010 | A1* | 3/2024 | Shi | F02D 41/1441 |

FOREIGN PATENT DOCUMENTS

JP        2016-056762 A        4/2016

* cited by examiner

*Primary Examiner* — Binh Q Tran
(74) *Attorney, Agent, or Firm* — SoraIP, Inc.

(57) ABSTRACT

In the processing circuit of the control device, the stress of the compressor impeller is acquired every predetermined control cycle. Setting a small section, and calculating a small section average value and a small section amplitude are repeatedly executed. Setting a middle section, and calculating a middle section average value and a middle section amplitude are repeatedly executed. The first damage value is calculated based on the small section average value and the small section amplitude. The second damage value is calculated based on the middle section average value and the middle section amplitude. An estimated value of the deterioration degree of the compressor impeller is calculated based on the integrated value of the first damage value and the second damage value.

4 Claims, 4 Drawing Sheets

DETERIORATION ESTIMATION DEVICE

CROSS-REFERENCE TO RELATED APPLICATION

This application claims priority to Japanese Patent Application No. 2022-197109 filed on Dec. 9, 2022, incorporated herein by reference in its entirety.

BACKGROUND

1. Technical Field

The present disclosure relates to a deterioration estimation device that estimates a degradation degree of a vehicle component.

2. Description of Related Art

Japanese Unexamined Patent Application Publication No. 2016-56762 (JP 2016-56762 A) discloses a method for diagnosing a fatigue failure of a turbocharger. In this method, a section is set. That is, an inflection point at which a rotation speed at the inflection point of the rotation speed of the turbocharger becomes equal to or lower than a threshold value is set as a start point of the section. Further, an inflection point at a time point when the rotation speed becomes equal to or lower than the threshold value next time is set as an end point of the section. A fatigue value of the section is calculated by performing a cycle count in the section by a rainflow method. The fatigue value is calculated every time the section is set. Then, the fatigue failure of the turbocharger is diagnosed by comparing the accumulated value of the fatigue value with a predetermined limit value.

SUMMARY

In the above-described method, the inflection point at which the rotation speed at the inflection point becomes equal to or less than the threshold value is set as the end point of the section. Therefore, the inflection point continues to be stored in a storage device until the rotation speed becomes equal to or lower than the threshold value. When an engine continues to be operated at a high load, the number of the inflection points stored in the storage device becomes very large because it takes time for the rotation speed to become equal to or less than the threshold value. Therefore, in order to realize the above-described method, a storage device having a relatively large storage capacity is required.

A deterioration estimation device for solving the above issue is a device that estimates a deterioration degree of a vehicle component provided in a vehicle.

The deterioration estimation device includes a processing circuit.

The Processing Circuit
- acquires, for each predetermined control cycle, a parameter in which there is a possibility that deterioration of the vehicle component proceeds when a value fluctuates,
- repeatedly executes setting a small section such that a length of a time is a first time, and calculating a small section average value that is an average value of a maximum value and a minimum value of the parameter in the small section, and a small section amplitude that is an amplitude of the parameter in the small section,
- repeatedly executes setting a middle section in which a time point at which the parameter becomes equal to or more than a parameter lower limit value is set as a start point, and a time point at which the parameter becomes less than the parameter lower limit value is set as an end point, and calculating a middle section average value that is an average value of the maximum value and the minimum value of the parameter in the middle section, and a middle section amplitude that is an amplitude of the parameter in the middle section,
- calculates a first damage value that is a deterioration degree of the vehicle component in the small section based on the small section average value and the small section amplitude,
- calculates a second damage value that is a deterioration degree of the vehicle component in the middle section based on the middle section average value and the middle section amplitude, and
- calculates an estimated value of the deterioration degree of the vehicle component based on an integrated value of the first damage value and the second damage value.

The fluctuation of the parameter may cause deterioration of the vehicle component to proceed.

Therefore, in the deterioration estimation device, each time the small section is set, the small section average value and the small section amplitude in the small section are calculated. Then, the first damage value is calculated based on the small section average value and the small section amplitude. The first damage value indicates the proceeding degree of the deterioration of the vehicle component caused by the fluctuation of the parameter in a relatively short section.

In the deterioration estimation device, each time the middle section is set, the middle section average value and the middle section amplitude in the middle section are calculated. Then, the second damage value is calculated based on the middle section average value and the middle section amplitude. The second damage value indicates the proceeding degree of the deterioration of the vehicle component caused by a large fluctuation of the parameter in a relatively long section.

In the deterioration estimation device, the estimated value of the deterioration degree of the vehicle component is calculated by integrating both the first damage value and the second damage value. In this case, the number of data stored in the memory of the processing circuit in the process of calculating the estimated value is smaller than in a case in which the rainflow method described above is used.

Therefore, the deterioration estimation device can estimate the deterioration degree of the vehicle component while suppressing an increase in the amount of the data stored in the memory.

When the above parameter is acquired, the parameter may be calculated by substituting a detection value of an in-vehicle sensor or a correlation value of the detection value into a physical expression. Further, the parameter may be calculated by inputting the detection value or the correlation value of the detection value to a learned model to which machine learning is applied.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of a deterioration estimation device will be described with reference to FIG. 1 to FIG. 6.

Figure 1:
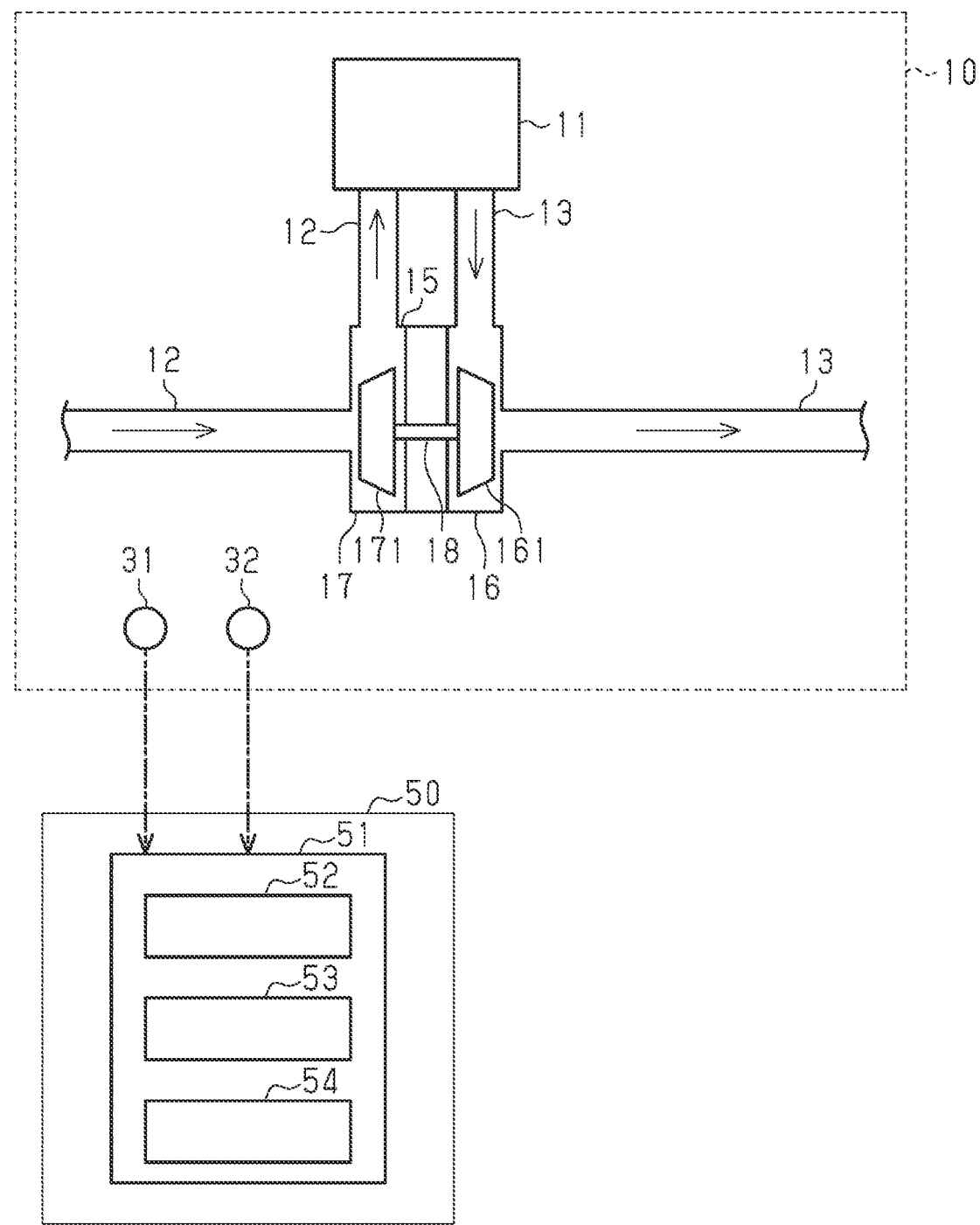
FIG. 1 is a configuration diagram illustrating a control device that is an embodiment of a deterioration estimation device and an internal combustion engine that is a control target of the control device.

FIG. 1 illustrates an internal combustion engine 10 and a control device 50 that controls the internal combustion engine 10. In the present embodiment, the control device 50 functions as a "deterioration estimation device".

Internal Combustion Engine

The internal combustion engine 10 includes a combustion chamber 11, an intake passage 12, an exhaust passage 13, and an exhaust-driven supercharger 15. Air flowing through the intake passage 12 is introduced into the combustion chamber 11. In the combustion chamber 11, an air-fuel mixture containing air and fuel is combusted. The exhaust gas generated by the combustion of the air-fuel mixture is discharged from the combustion chamber 11 to the exhaust passage 13.

The supercharger 15 includes a turbine 16 and a compressor 17. The turbine 16 is provided in the exhaust passage 13. The compressor 17 is provided at a portion of the intake passage 12 upstream of the throttle valve. Depending on the type of the internal combustion engine, a throttle valve may be provided at a portion of the intake passage 12 upstream of the compressor 17. The compressor impeller 171 of the compressor 17 is coupled to the turbine wheel 161 of the turbine 16 via a coupling shaft 18. Therefore, when the turbine wheel 161 rotates due to the flow force of the exhaust gas flowing through the exhaust passage 13, the compressor impeller 171 rotates in synchronization with the turbine wheel 161. Thus, the air flowing through the intake passage 12 is pressurized.

Control Device

Signals are input to the control device 50 from a plurality of types of sensors that detect the state of the internal combustion engine 10. The plurality of types of sensors includes a supercharging pressure sensor 31 and a flow rate sensor 32. The supercharging pressure sensor 31 detects the pressure of the intake air pressurized by the compressor impeller 171. The flow rate sensor 32 detects the flow rate of the intake air flowing into the compressor 17. The pressure of the intake air based on the detected value of the supercharging pressure sensor 31 is referred to as a "supercharging pressure PTC". The flow rate of the intake air based on the detected value of the flow rate sensor 32 is referred to as "air flow rate QTC".

The control device 50 includes a processing circuit 51. For example, the processing circuit 51 is an electronic control unit. The processing circuit 51 includes a CPU 52, a first memory 53, and a second memory 54. The first memories 53 store control programs executed by CPU 52. The second memories 54 temporarily store CPU 52 computations. When CPU 52 executes the control program of the first memory 53, the processing circuit 51 estimates the degree of degradation of the components of the internal combustion engine 10. In the present embodiment, the processing circuit 51 estimates the degree of deterioration of the compressor impeller 171. Therefore, the compressor impeller 171 corresponds to a "vehicle component" to which the degree of deterioration is estimated.

Figure 2:
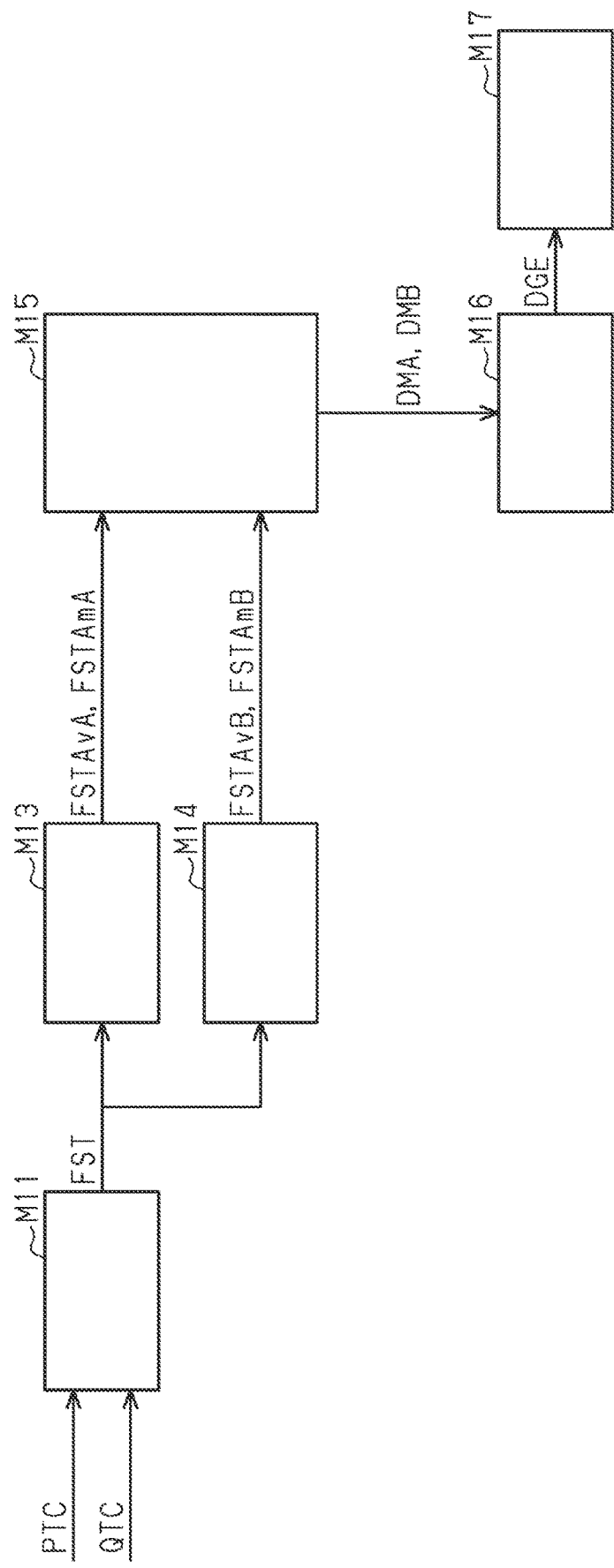
FIG. 2 is a block diagram illustrating a plurality of processes executed by the control device of FIG. 1.
Figure 3:
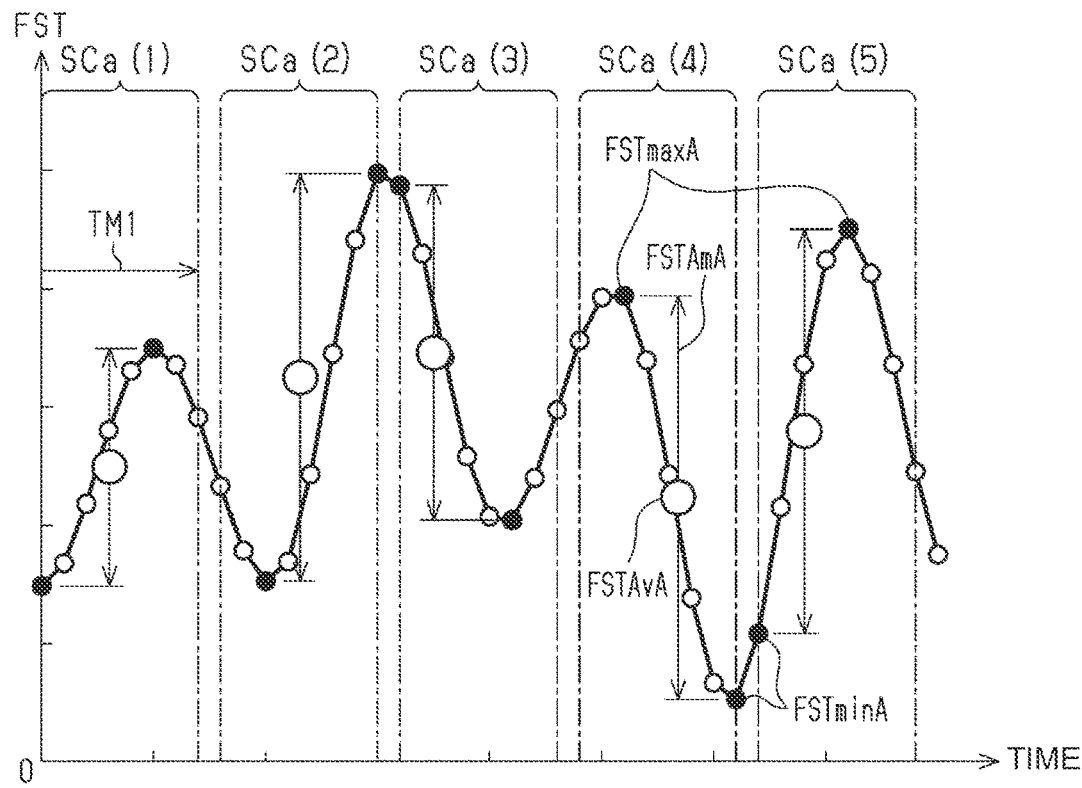
FIG. 3 is a graph for explaining the contents of the small section processing among the plurality of processing illustrated in FIG. 2.
Figure 4:
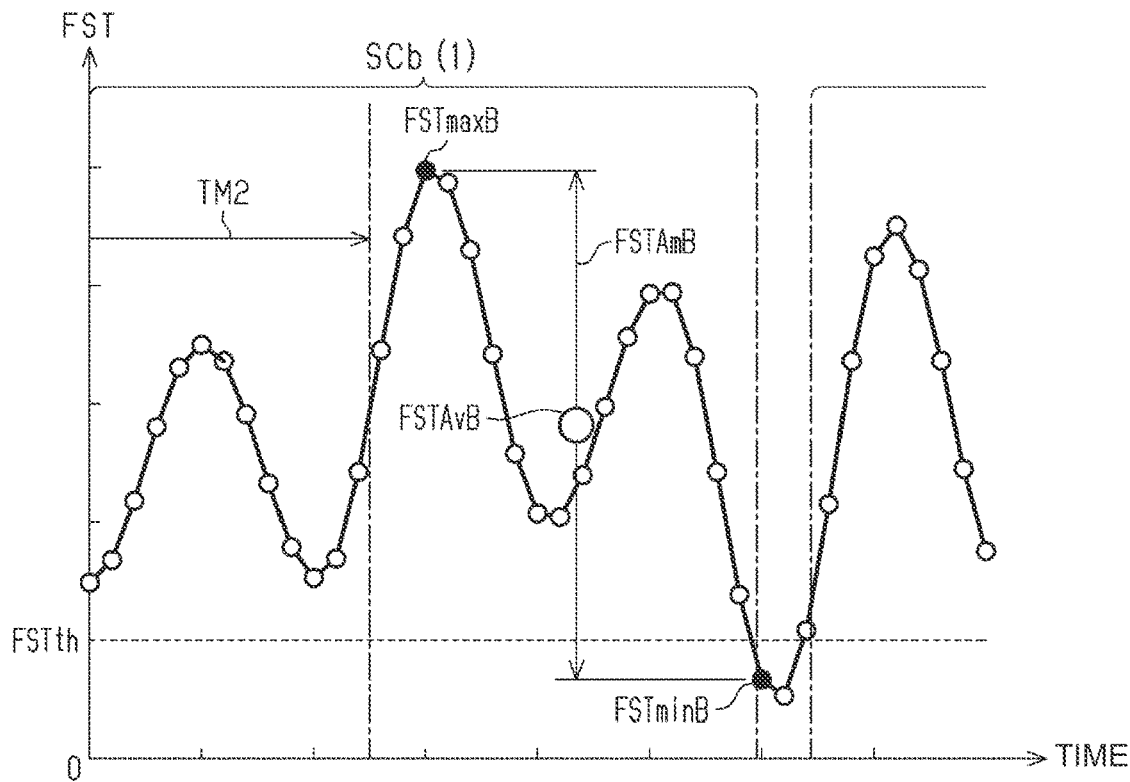
FIG. 4 is a graph for explaining the contents of the middle section process among the plurality of processes in FIG. 2.

Referring to FIGS. 2 to 4, a plurality of processes executed by the processing circuit 51 in order to estimate the degree of deterioration of the compressor impeller 171 will be described.

As illustrated in FIG. 2, the processing circuit 51 executes a stress calculation processing M11, a small section processing M13, a middle section processing M14, a damage calculation processing M15, an estimation processing M16, and a diagnostic processing M17.

<Stress Calculation Process>

The processing circuit 51 calculates the stress FST applied to the compressor impeller 171 in the stress calculation processing M11. As the stress applied to the compressor impeller 171 repeatedly fluctuates, deterioration of the compressor impeller 171 may progress. Therefore, the processing circuit 51 calculates stress FST applied to the compressor impeller 171 as a parameter that may cause degradation of the vehicular components to proceed. The processing circuit 51 executes the stress-calculation processing M11 for each predetermined control cycle.

Specifically, the processing circuit 51 calculates an impeller rotation speed NCI, which is a rotation speed of the compressor impeller 171, based on the supercharging pressure PTC and the air flow rate QTC. For example, the processing circuit 51 calculates the impeller rotation speed NCI such that the higher the supercharging pressure PTC, the higher the rotational speed. The processing circuit 51 calculates the impeller rotation speed NCI such that the rotational speed increases as the air flow rate QTC increases. The processing circuit 51 calculates the centrifugal force FC acting on the compressor impeller 171 based on the impeller rotation speed NCI. At this time, the processing circuit 51 calculates the centrifugal force FC by substituting the impeller rotation speed NCI into a well-known physical expression. Then, the processing circuit 51 calculates stress FST such that the larger the centrifugal force FC, the larger the value.

<Processing for Small Section>

As illustrated in FIG. 3, the processing circuit 51 sets the small section SCa so that the length of time becomes the first time TM1 in the small section processing M13. The processing circuit 51 repeatedly performs the setting of the small section SCa.

Further, in the small section processing M13, the processing circuit 51 calculates the small-section mean FSTAVA and the small-section magnitude FSTAmA based on the transition of the stress FST in the small-section SCa. Each time the small section SCa is set, the processing circuit 51 calculates the small section mean FSTAVA and the small section magnitude FSTAmA based on the transition of the stress FST in the small section SCa. Specifically, the processing circuit 51 acquires the maximum value FSTmaxA and the minimum value FSTminA of the stress FST in the small section SCa. The processing circuit 51 calculates the average value of the maximum value FSTmaxA and the minimum value FSTminA as the small section average value FSTAvA. For example, the processing circuit 51 calculates a value obtained by dividing the sum of the maximum value FSTmaxA and the minimum value FSTminA by 2 as the small section mean value FSTAVA. The processing circuit 51 calculates a small section amplitude FSTAmA, which is the amplitude of the stress FST in the small section SCa, based on the largest value FSTmaxA and the smallest value FSTminA. For example, the processing circuit 51 calculates a value obtained by dividing the difference between the maximum value FSTmaxA and the minimum value FSTminA by 2 as the small section magnitude FSTAmA.

<Processing for Middle Section>

The processing circuit 51 sets the middle section SCb in the middle section processing M14. That is, as illustrated in FIG. 4, the processing circuit 51 sets a point of time at which the stress FST becomes equal to or greater than the stress lower limit value FSTth as the start point of the middle section SCb. The processing circuit 51 sets the end point of the middle section SCb at a time point at which and the stress FST becomes less than the stress lower limit value FSTth in a state in which the elapsed time from the start point of the middle section SCb exceeds the second time TM2 longer than the first time TM1. As a result, the processing circuit 51 can set the middle section SCb to be longer in time than the small section SCa. The stress lower limit value FSTth is set as a criterion for determining whether or not the stress FST becomes sufficiently small. In the present embodiment, since the stress FST corresponds to the parameter, the stress lower limit value FSTth corresponds to the "parameter lower limit value".

In the middle section processing M14, the processing circuit 51 calculates the middle section mean FSTAvB and the middle section magnitude FSTAmB based on the transition of the stress FST in the middle section SCb. Each time the middle section SCb is set, the processing circuit 51 calculates the middle section mean FSTAvB and the middle section magnitude FSTAmB based on the transition of the stress FST in the middle section SCb. Specifically, the processing circuit 51 acquires the maximum value FSTmaxB and the minimum value FSTminB of the stress FST in the middle section SCb. The processing circuit 51 calculates the average value of the maximum value FSTmaxB and the minimum value FSTminB as the medium interval average value FSTAvB. For example, the processing circuit 51 calculates a value obtained by dividing the sum of the maximum value FSTmaxB and the minimum value FSTminB by 2 as the medium interval mean value FSTAvB. The processing circuit 51 calculates a middle interval amplitude FSTAmB, which is the amplitude of the stress FST in the middle section SCb, based on the largest value FSTmaxB and the smallest value FSTminB. For example, the processing circuit 51 calculates a value obtained by dividing the difference between the maximum value FSTmaxB and the minimum value FSTminB by 2 as the middle section magnitude FSTAmB.

<Damage Calculation Process>

Returning to FIG. 2, in the damage calculation processing M15, the processing circuit 51 calculates a first damage value DMA that is a degree of degradation of the compressor impeller 171 in the small section SCa. That is, the processing circuit 51 calculates the first damage value DMA of the small section SCa in which the small section average value FSTAVA and the small section amplitude FSTAmA are calculated based on the small section average value FSTAVA and the small section amplitude FSTAmA. The processing circuit 51 executes the damage calculation processing M15 to calculate the first damage value DMA every time the small section mean value FSTAVA and the small section magnitude FSTAmA are calculated in the small section processing M13. The first damage value DMA can be said to be a value corresponding to the degree of deterioration of the compressor impeller 171 caused by the short-period vibration of the stress FST in the small section SCa.

Further, in the damage calculation processing M15, the processing circuit 51 calculates a second damage value DMB that is a degree of degradation of the compressor impeller 171 in the middle section SCb. That is, the processing circuit 51 calculates the second damage value DMB of the middle section SCb in which the middle section average value FSTAvB and the middle section amplitude FSTAmB are calculated based on the middle section average value FSTAvB and the middle section amplitude FSTAmB. The processing circuit 51 executes the damage calculation processing M15 to calculate the second damage value DMB every time the middle section mean value FSTAvB and the middle section magnitude FSTAmB are calculated in the middle section processing M14. The second damage value DMB can be said to be a value corresponding to the degree of deterioration of the compressor impeller 171 caused by the oscillation of the long period of the stress FST in the middle section SCb.

Figure 5:
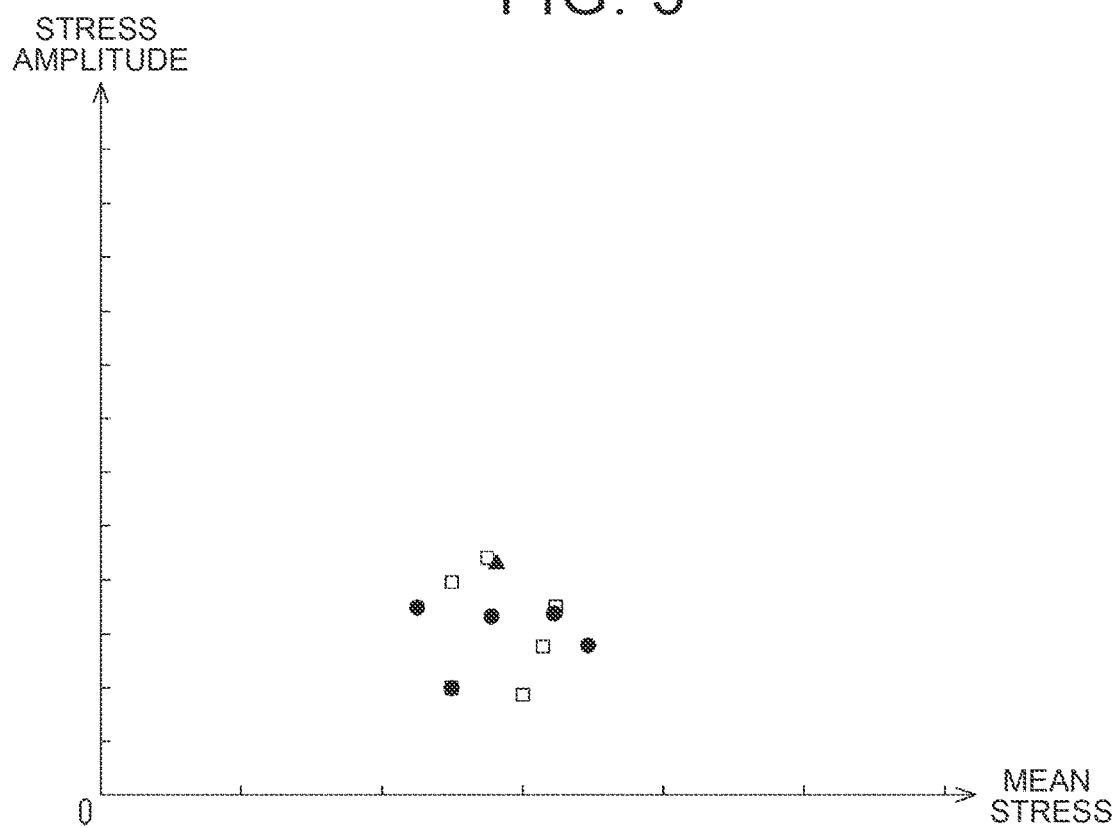
FIG. 5 is a graphical representation of the mean stress and stress magnitude of the compressor impeller of the internal combustion engine of FIG. 1.
Figure 6:
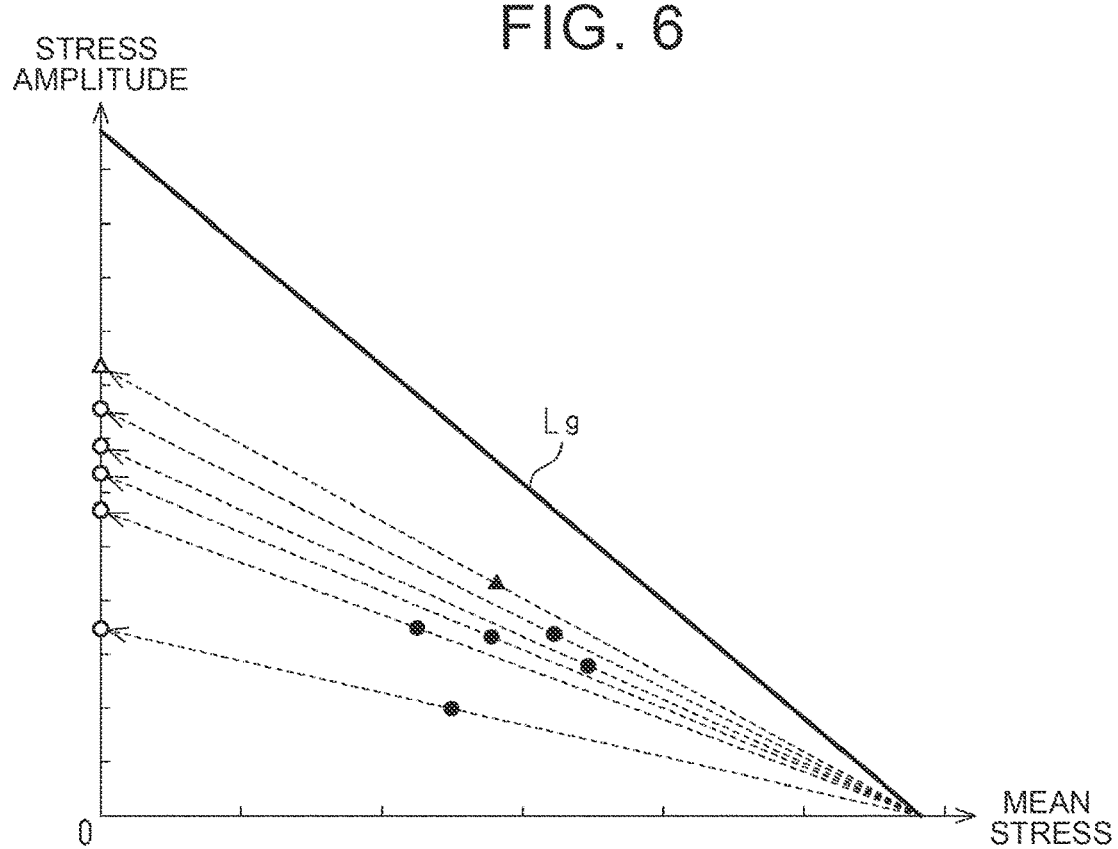
FIG. 6 is a modified Goodman diagram showing the average stress and stress amplitude of a compressor impeller included in the internal combustion engine of FIG. 1.

Referring to FIGS. 5 and 6, the damage calculation processing M15 will be described in detail. FIG. 5 is a graph in which the horizontal axis represents the average stress and the vertical axis represents the stress amplitude. In FIG. 5, the black circle indicates the average-value FSTAVA of the small section in the small section SCa and the small section amplitude FSTAmA. The black triangle indicates the mean FSTAvB of the middle section and the magnitude FSTAmB of the middle section in the middle section SCb.

In the graph as illustrated in FIG. 5, the processing circuit 51 plots a point indicating the average-value FSTAVA of the small section and the amplitude FSTAmA of the small section calculated by the small section processing M13. Further, the processing circuit 51 plots a point indicating the mean FSTAvB of the middle section and the magnitude FSTAmB of the middle section calculated in the middle section processing M14.

Here, FIG. 5 also illustrates a comparative example in which the average stress and the stress amplitude are calculated by the rainflow method. Points indicating the average stress and the stress amplitude calculated by the Rainflow method are indicated by open squares. As is apparent from FIG. 5, the plurality of points indicating the average stress and the stress amplitude obtained in the present embodiment are distributed in the same region as the plurality of points indicating the average stress and the stress amplitude calculated by the rainflow method.

FIG. 6 is a modified Goodman diagram generated based on points plotted in the graph shown in FIG. 5. The straight line in FIG. 6 is a modified Goodman line Lg. Then, as indicated by the broken-line arrow in FIG. 6, the processing circuit 51 converts the stress amplitude indicated by the plot on the graph so that the average stress becomes 0 (zero). The converted stress amplitude is referred to as "converted stress amplitude".

Subsequently, the processing circuit 51 plots a plurality of converted stress-amplitudes on SN diagram. Then, the processing circuit 51 converts the plurality of converted stress amplitudes into damage values by using the modified minor rule. At this time, the value obtained by converting the converted stress amplitude converted from the small section amplitude FSTAmA into the damage value corresponds to the "first damage value DMA". Further, a value obtained by converting the converted stress amplitude converted from the middle section amplitude FSTAmB into a damage value corresponds to the "second damage value DMB".

<Estimation Process>

In the estimation processing M16, the processing circuit 51 calculates a deterioration estimation value DGE, which is an estimation value of the degradation degree of the compressor impeller 171, based on the first damage value DMA and the second damage value DMB. Specifically, the processing circuit 51 calculates the sum of the integrated value of the first damage value DMA and the integrated value of the second damage value DMB as the deterioration estimation value DGE.

<Diagnostic Processing>

The processing circuit 51 compares the deterioration estimation value DGE with a predetermined deterioration determination value DGEth in the diagnostic processing M17. The deterioration determination value DGEth is a criterion for determining whether or not the compressor impeller 171 needs to be maintained. When the deterioration estimation value DGE is equal to or larger than the deterioration determination value DGEth, the processing circuit 51 diagnoses that the compressor impeller 171 needs to be maintained.

<Action and Effect>

In the control device 50, each time the small section SCa is set, the small section mean FSTAVA and the small section magnitude FSTAmA in the small section SCa are calculated. Then, the first damage value DMA is calculated based on the small section mean value FSTAVA and the small section magnitude FSTAmA.

In the control device 50, each time the middle section SCb is set, the middle section mean FSTAvB and the middle section magnitude FSTAmB in the middle section SCb are calculated. Then, the second damage value DMB is calculated based on the medium interval mean value FSTAvB and the medium interval magnitude FSTAmB.

In the control device 50, the deterioration estimation value DGE is calculated by integrating both the first damage value DMA and the second damage value DMB.

When the deterioration estimation value DGE is calculated by the above-described method, the processing circuit 51 may store only the maximal value FSTmaxA and the minimal value FSTminA in the second memories 54 among the plurality of stress FST calculated in a certain small section SCa. Further, the processing circuit 51 can erase the maximum value FSTmaxA and the minimum value FSTminA from the second memories 54 by calculating the small interval mean value FSTAVA and the small interval magnitude FSTAmA using the stored maximum value FSTmaxA and the minimum value FSTminA.

Similarly, the processing circuit 51 may store only the maximum value FSTmaxB and the minimum value FSTminB among the plurality of stress FST calculated in the middle section SCb in the second memories 54. Further, the processing circuit 51 can erase the maximum value FSTmaxB and the minimum value FSTminB from the second memories 54 by calculating the middle interval mean value FSTAvB and the middle interval magnitude FSTAmB using the stored maximum value FSTmaxB and the minimum value FSTminB.

Therefore, compared with the conventional technique in which it is necessary to continuously store the inflection point of the rotation speed in the memory until the section can be set, in the present embodiment, the amount of data temporarily stored in the second memory 54 can be reduced. Therefore, in the present embodiment, it is possible to estimate the degree of deterioration of the compressor impeller 171 while suppressing an increase in the amount of data stored in the second memory 54.

In the present embodiment, the following effects can be further obtained. (1) As in the case of the small section SCa, the middle section SCb is divided only by the length of time. If the internal combustion engine 10 is operated in such a manner that the stress FST does not decrease due to the high-speed rotating of the compressor impeller 171 continuing for a long period of time or the like, it may not be possible to calculate the damage caused by the gentle oscillation of the stress FST.

In this regard, in the present embodiment, a time point at which the stress FST becomes less than the stress lower limit value FSTth is set as the end point of the middle section SCb. Thus, even if the internal combustion engine 10 performs an operation such that the stress FST does not decrease as described above, the damage value caused by the gradual change in the stress FST can be calculated as the second damage value DMB.

(2) In the present embodiment, the length of time in the middle section SCb can be longer than the length of time in the small section SCa. As a result, in the small section processing M13, by monitoring the short-term oscillation of the stress FST, it is possible to obtain the maximum value FSTmaxA and the minimum value FSTminA of the stress. On the other hand, in the middle section processing M14, by monitoring the long-term oscillation of the stress FST, it is possible to obtain the maximum value FSTmaxB and the minimum value FSTminB of the stress. Consequently, the degree of degradation of the compressor impeller 171 caused by the short-term oscillation of the stress FST can be calculated as the first damage value DMA. In addition, the degree of degradation of the compressor impeller 171 caused by long-term oscillation of the stress FST can be calculated as the second damage value DMB.

Modifications

The above embodiment can be modified and implemented as follows. The above embodiment and modification examples described below may be carried out in combination of each other within a technically consistent range.

The control device 50 may be embodied in a control device that estimates the degree of deterioration of other vehicle components other than the compressor impeller 171. For example, other vehicle components may be components of other internal combustion engines 10, such as throttle valves. The other vehicle components may not be components of the internal combustion engine 10.

The second time TM2 may be the same as the first time TM1.

Regardless of whether or not the elapsed time from the start point of the middle section SCb is equal to or more than the first time TM1, the end point of the middle section SCb may be set at a time point at which the stress FST becomes less than the stress lower limit value FSTth.

When the supercharger 15 includes a sensor for detecting the rotational speed of the compressor impeller 171, the processing circuit 51 may calculate the impeller rotation speed NCI based on the detected value of the sensor.

The control device 50 may acquire a value other than stress as a parameter. Parameters other than stresses can include, for example, thermal, humid, and PH.

The control device 50 may calculate stress FST using the learned model subjected to the machine learning. The control device 50 can calculate a value corresponding to the supercharging pressure PTC and the air flow rate QTC as the stress FST by using the learned model in which the supercharging pressure PTC and the air flow rate QTC are input variables.

In determining the first time TM1, which is the length of time of the small section SCa, the first time TM1 may be determined using the learned model.

In determining the stress lower limit value FSTth, the stress lower limit value FSTth may be determined using a learned model.

The processing circuit 51 includes a CPU and a ROM, and is not limited to executing software processing. That is, the processing circuit 51 may have any of the following configurations (a), (b), and (c).

(a) The processing circuit 51 includes one or more processors that execute various kinds of processing in accordance with a computer program. The processor includes CPU and memories such as RAM and ROM. The memory stores a program code or a command configured to cause the CPU to execute the process. Memory, or computer readable media, includes any available media that can be accessed by a general purpose or special purpose computer.

(b) The processing circuit 51 includes one or more dedicated hardware circuits for executing various processes. Dedicated hardware circuits can include, for example, application-specific integrated circuits, i.e., Application Specific Integrated Circuit (ASIC) or Field Programmable Gate Array (FPGA).

(c) The processing circuit 51 includes a processor that executes a part of various kinds of processing in accordance with a computer program, and a dedicated hardware circuit that executes the rest of the various kinds of processing.

What is claimed is:

1. A deterioration estimation device that estimates a deterioration degree of a vehicle component provided in a vehicle, the deterioration estimation device comprising a processing circuit, wherein the processing circuit
   acquires, for each predetermined control cycle, a parameter in which there is a possibility that deterioration of the vehicle component proceeds when a value fluctuates,
   repeatedly executes setting a small section such that a length of a time is a first time, and calculating a small section average value that is an average value of a maximum value and a minimum value of the parameter in the small section, and a small section amplitude that is an amplitude of the parameter in the small section,
   repeatedly executes setting a middle section in which a time point at which the parameter becomes equal to or more than a parameter lower limit value is set as a start point, and a time point at which the parameter becomes less than the parameter lower limit value is set as an end point, and calculating a middle section average value that is an average value of the maximum value and the minimum value of the parameter in the middle section, and a middle section amplitude that is an amplitude of the parameter in the middle section,
   calculates a first damage value that is a deterioration degree of the vehicle component in the small section based on the small section average value and the small section amplitude,
   calculates a second damage value that is a deterioration degree of the vehicle component in the middle section based on the middle section average value and the middle section amplitude, and
   calculates an estimated value of the deterioration degree of the vehicle component based on an integrated value of the first damage value and the second damage value.

2. The deterioration estimation device according to claim 1, wherein when setting the middle section, the processing circuit sets, as the end point of the middle section, a time point at which the parameter becomes less than the parameter lower limit value in a state in which an elapsed time from the start point is longer than the first time.

3. The deterioration estimation device according to claim 2, wherein when setting the middle section, the processing circuit sets, as the end point of the middle section, a time point at which the parameter becomes less than the parameter lower limit value in a state in which the elapsed time from the start point exceeds a second time longer than the first time.

4. The deterioration estimation device according to claim 1, wherein the parameter is a stress applied to the vehicle component.

* * * * *